(12) United States Patent
Feng

(10) Patent No.: US 7,493,842 B2
(45) Date of Patent: Feb. 24, 2009

(54) BAND SAW QUICKLY CHANGING DEVICE FOR A BAND SAW MACHINE

(75) Inventor: Chang Ching Feng, Feng Yuan (TW)

(73) Assignee: King Saw Machinery Ltd., Taichung Hsien (TW)

( * ) Notice: Subject to any disclaimer, the term of this patent is extended or adjusted under 35 U.S.C. 154(b) by 203 days.

(21) Appl. No.: 11/727,190

(22) Filed: Mar. 23, 2007

(65) Prior Publication Data

US 2008/0229894 A1    Sep. 25, 2008

(51) Int. Cl.
    *B27B 13/08* (2006.01)
(52) U.S. Cl. .............................. 83/816; 83/788; 83/809
(58) Field of Classification Search .................. 83/816, 83/814, 813, 788, 806, 809
    See application file for complete search history.

(56) References Cited

U.S. PATENT DOCUMENTS

| 1,571,972 | A | * | 2/1926 | Schettler | 83/816 |
| 4,311,074 | A | * | 1/1982 | Titus | 83/816 |
| 6,557,447 | B2 | * | 5/2003 | Lee | 83/816 |
| 6,739,231 | B2 | * | 5/2004 | Snodgrass, Jr. | 83/816 |
| 7,311,029 | B2 | * | 12/2007 | Behne | 83/816 |
| 2005/0000347 | A1 | * | 1/2005 | Lin | 83/809 |

* cited by examiner

*Primary Examiner*—Stephen Choi
(74) *Attorney, Agent, or Firm*—Ming Chow; Sinorica, LLC

(57) ABSTRACT

A band saw quickly changing device for a band saw machine is pivotally connected to a turning wheel of the machine body, including a sliding base, two limiting bases, a spring, a support plate, a micro-adjusting rod, a quickly adjusting device and a bottom base. The quickly adjusting device is composed of a shifting block, an eccentric block and a handling rod. The eccentric block has an eccentric shaft hole for pivotally connected on the shifting block, and the handling rod has a pivotal member formed in its upper end to fit in the eccentric shaft hole and fixed therein with a bolt. When the handling rod is swung backward, the sliding base is moved down to let the upper turning wheel move down, loosening the band saw extending around the two turning wheels of the machine.

4 Claims, 10 Drawing Sheets

BAND SAW QUICKLY CHANGING DEVICE FOR A BAND SAW MACHINE

BACKGROUND OF THE INVENTION

1. Field of the Invention

This invention relates to a band saw machine, particularly to one provided with a band saw changing device, wherein a quickly adjusting device is added for quick adjustment for changing a band saw.

2. Description of the Prior Art

As shown in FIG. 1, a conventional band saw changing device 10 in a band saw machine includes a sliding base 11, two limiting bases 12 for the sliding base 11 to sliding between them, a shaft fixing base 111 fitted in an upper portion of the sliding base 11, a shaft 112 of the shaft fixing base 111 being connected to a turning wheel 1, a limiting member 113 laterally fixed in an intermediate portion of the sliding base 11, a spring 13 located under the limiting member 113, a support disc 14 supporting the spring 13, a micro adjusting rod 15 having a guide threaded portion 151 formed on an upper portion and threadably combined with a threaded hole 141 of the support disc 14 to further pass through the spring 13 and the limiting member 113, and a bottom base 16 fixed under the two limiting bases 12. The micro-adjusting rod 15 passes through the bottom base 16, and a ring 152 is pivotally connected to the micro-adjusting rod 15 just on the bottom base 16. The micro-adjusting rod 15 is provided with a hand wheel 153 at the lower end.

In using, when the hand wheel 153 is turned clockwise or counterclockwise, the guide threaded portion 151 of the micro adjusting rod 15 is rotated to move the support disc 14 upward or downward, so the shaft fixing block 111 of the sliding base 11 and the turning wheel 1 may be moved up or down accordingly, increasing or reducing the distance between the turning wheel 1 and a lower wheel for tightening or loosening for taking off a band saw extending around the two turning wheels. However, when the conventional band saw changing device 10 is handled to change the band saw, the turning wheel 153 of the micro-adjusting rod 15 is rotated to move the sliding base 11 along between the two limiting bases 12. But the guide threaded portion 151 moves up or down for a very minute distance by rotation, so one round of the hand wheel 153 may force the sliding base 11 to move up or down only a bit, taking a rather long time needed in rotating the hand wheel 153 before the band saw can be taken off. Accordingly, tightening a new band saw also needs a long time, not ideal for operating the conventional band saw changing device 10.

SUMMARY OF THE INVENTION

The features of the band saw quickly changing device for a band saw machine in the invention are a slide base, two limiting bases, a spring, a support plate, a micro-adjusting rod, a quickly adjusting device and a bottom base.

The quickly adjusting device is composed of a shifting block, an eccentric block, and a handling rod. The eccentric block is pivotally connected on the shifting block, and the handling rod has a pivotal member formed in an upper end to fit and be fixed in an eccentric shaft hole of the eccentric block with a fastening means. When the handling rod is swung backward, the sliding base is moved down between the two limiting bases, loosening the band saw extending around the two turning wheels of the machine, so the band saw can be taken off and changed to a new one quickly.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
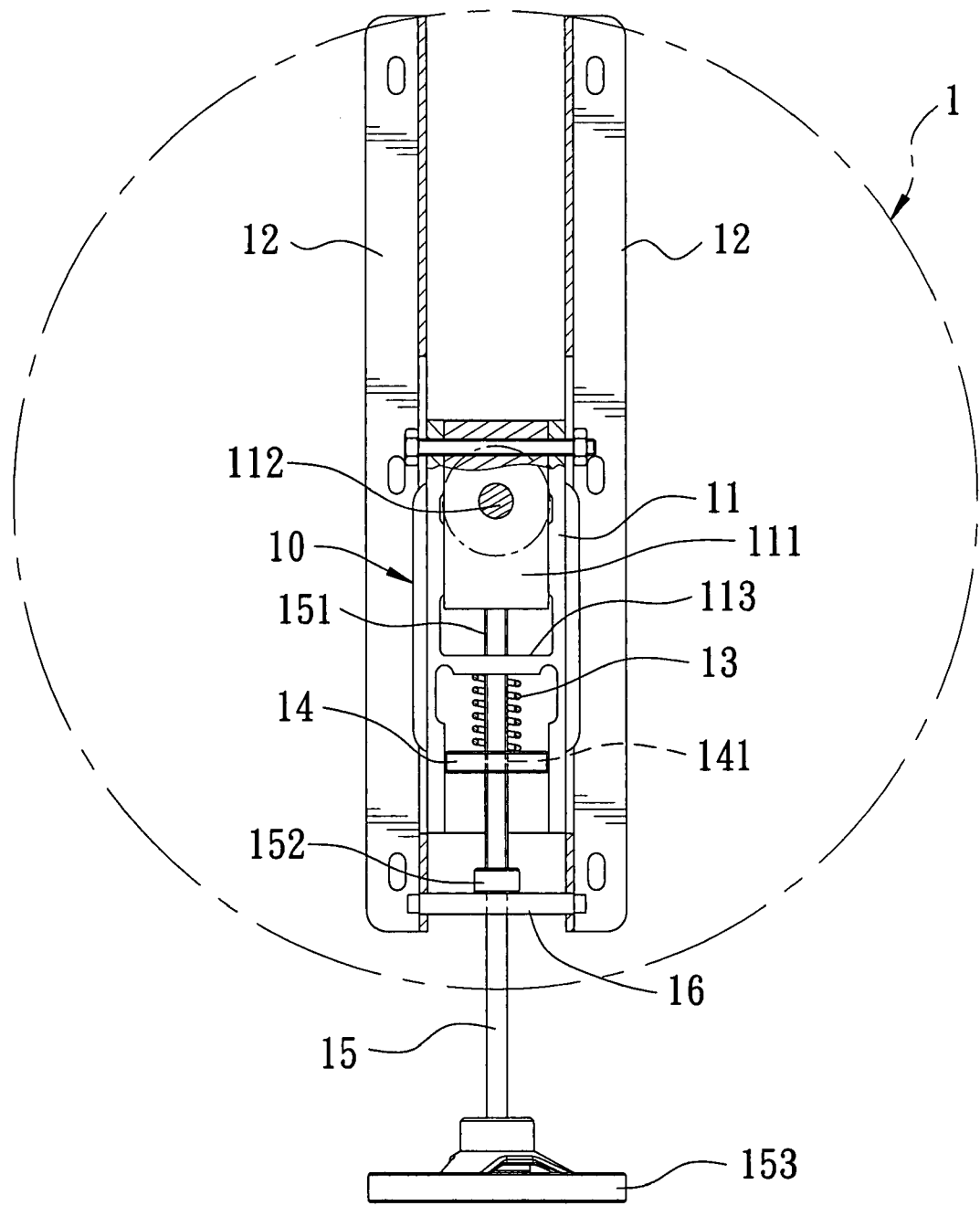
FIG. 1 is a cross-sectional view of a conventional band saw changing device for a band saw machine.
Figure 2:
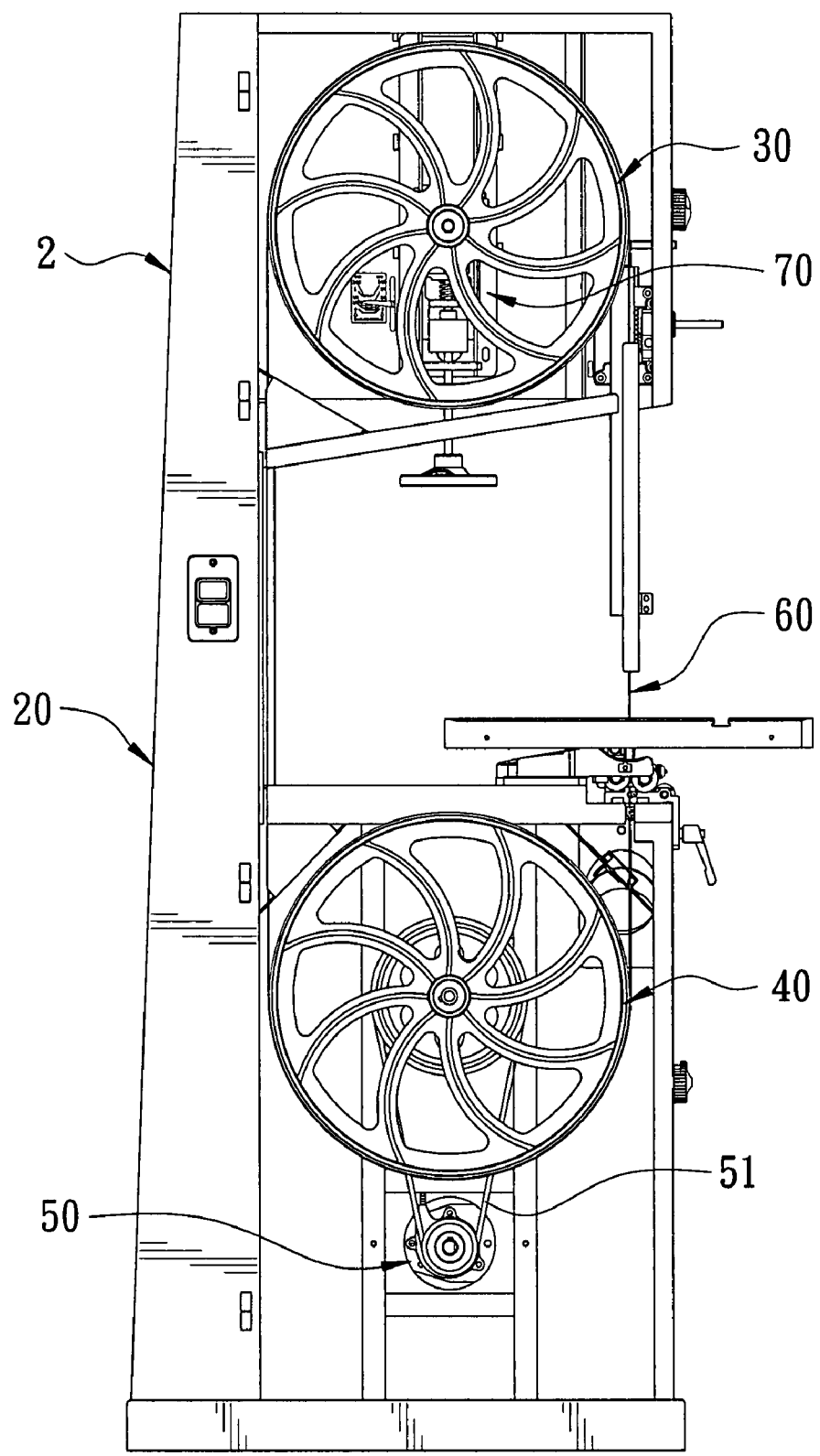
FIG. 2 is a side view of a band saw machine provided with a band saw quickly changing device in the present invention.
Figure 3:
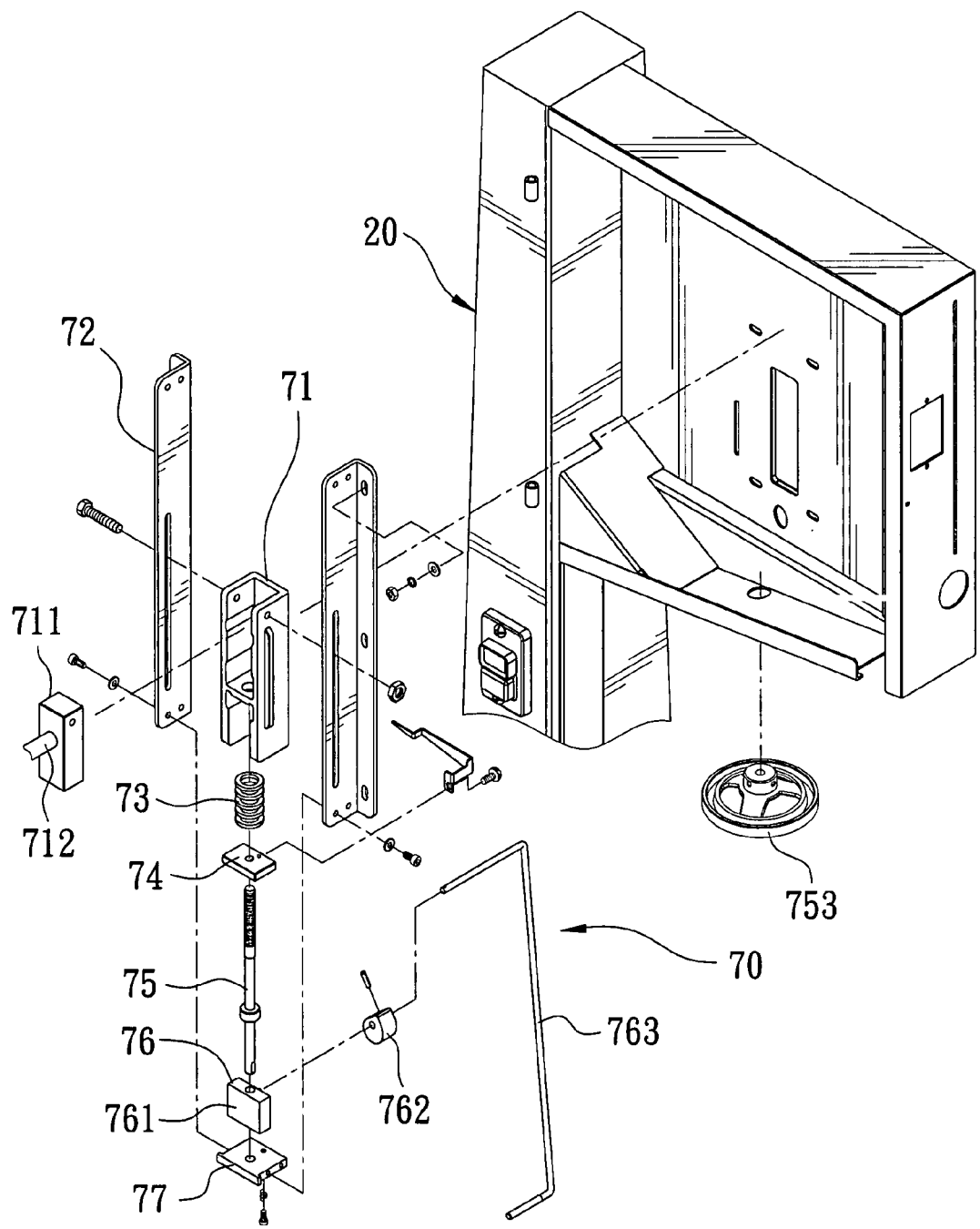
FIG. 3 is a partial exploded perspective view of the band saw quickly changing device in the present invention.
Figure 4:
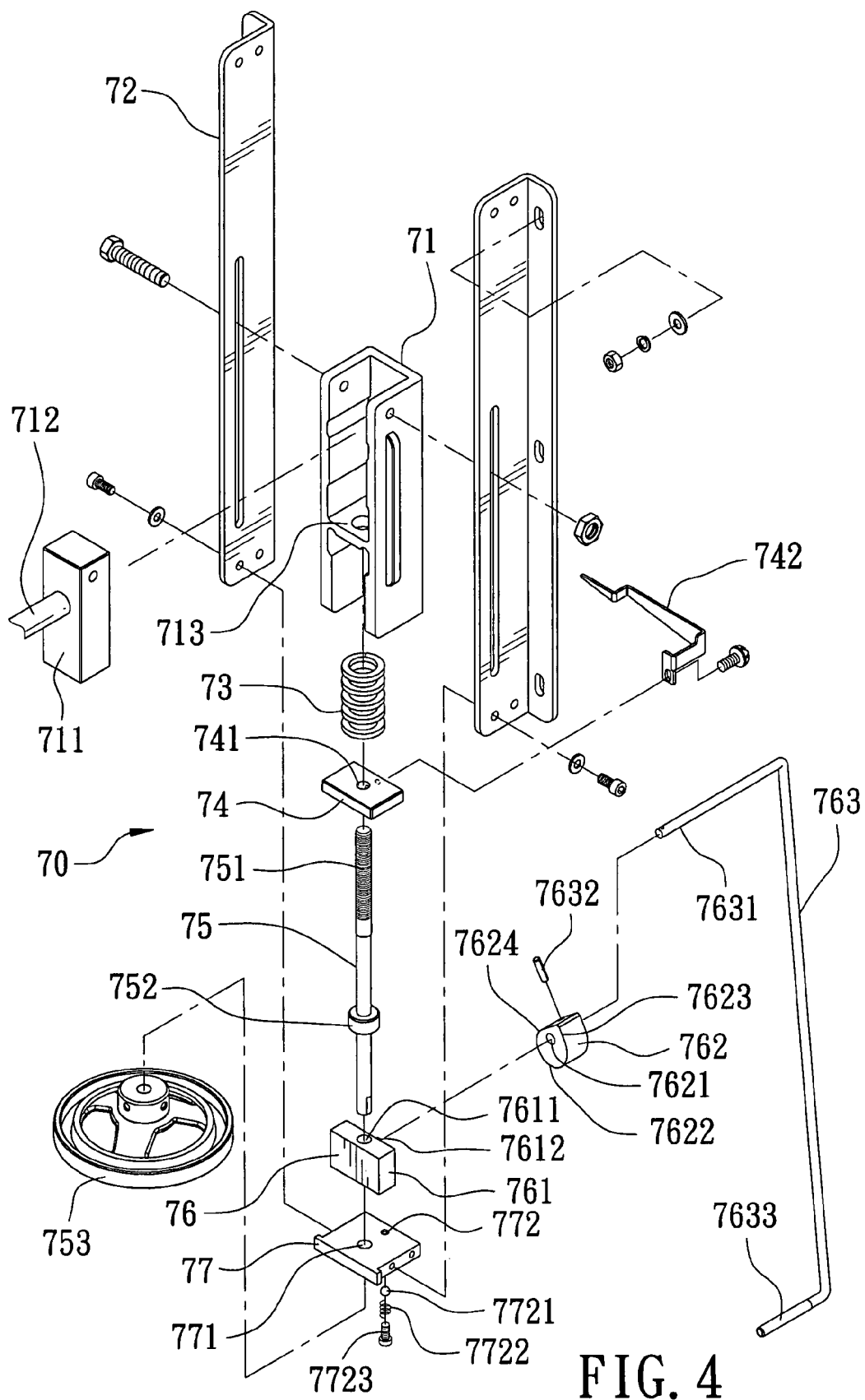
FIG. 4 is an exploded perspective view of the band saw quickly changing device in the present invention.

As shown in FIGS. 2, 3 and 4, a preferred embodiment of a band saw quickly changing device 70 for a band saw machine in the present invention combined pivotally with an upper turning wheel 30 installed on an upper portion of the machine body 20 of a band saw machine that also includes a lower turning wheel 40, a motor 50, a leather band 51 driven by the motor 50 to rotate the lower turning wheel 40 and the upper turning wheel 30 at the same time.

The band saw quickly changing device 70 is composed of a sliding base 71, two limiting bases 72, a spring 73, a support plate 74, a micro adjusting rod 75, a quickly adjusting device 76 and a bottom base 77.

The sliding base 71 slides vertically along between the two limiting bases 72, having a shaft fixing block 711 fixed in an upper portion and having a shaft 712 to connect with the upper turning wheel 30. The sliding base 71 further has a limiting member 713 formed transversely in an intermediate portion, and the spring 73 located just under the limiting member 713, with the support plate 74 underpinning the spring 73. The support plate 74 has a center threaded hole 741, and the micro adjusting rod 75 has a guide threaded portion 751 formed in an upper portion to engage with the threaded hole 741 and further passing through the spring 73 and the limiting member 713. At the same time, the micro-adjusting rod 75 passes downward through the quickly adjusting device 76 located between the two limiting bases 72 and the bottom base 77 under the quickly adjusting device 76 to expose down. In addition, the micro-adjusting rod 75 has a flange 752 in a lower portion to position on the quickly adjusting device 76 and a hand wheel 753 fixed with a lower end for turning the micro-adjusting rod 75. As to the other components are the same as those in the conventional device, not to be described their detail.

The quickly adjusting device 76 is composed of a shifting block 761, an eccentric block 762 and a handling rod 763.

Figure 10:
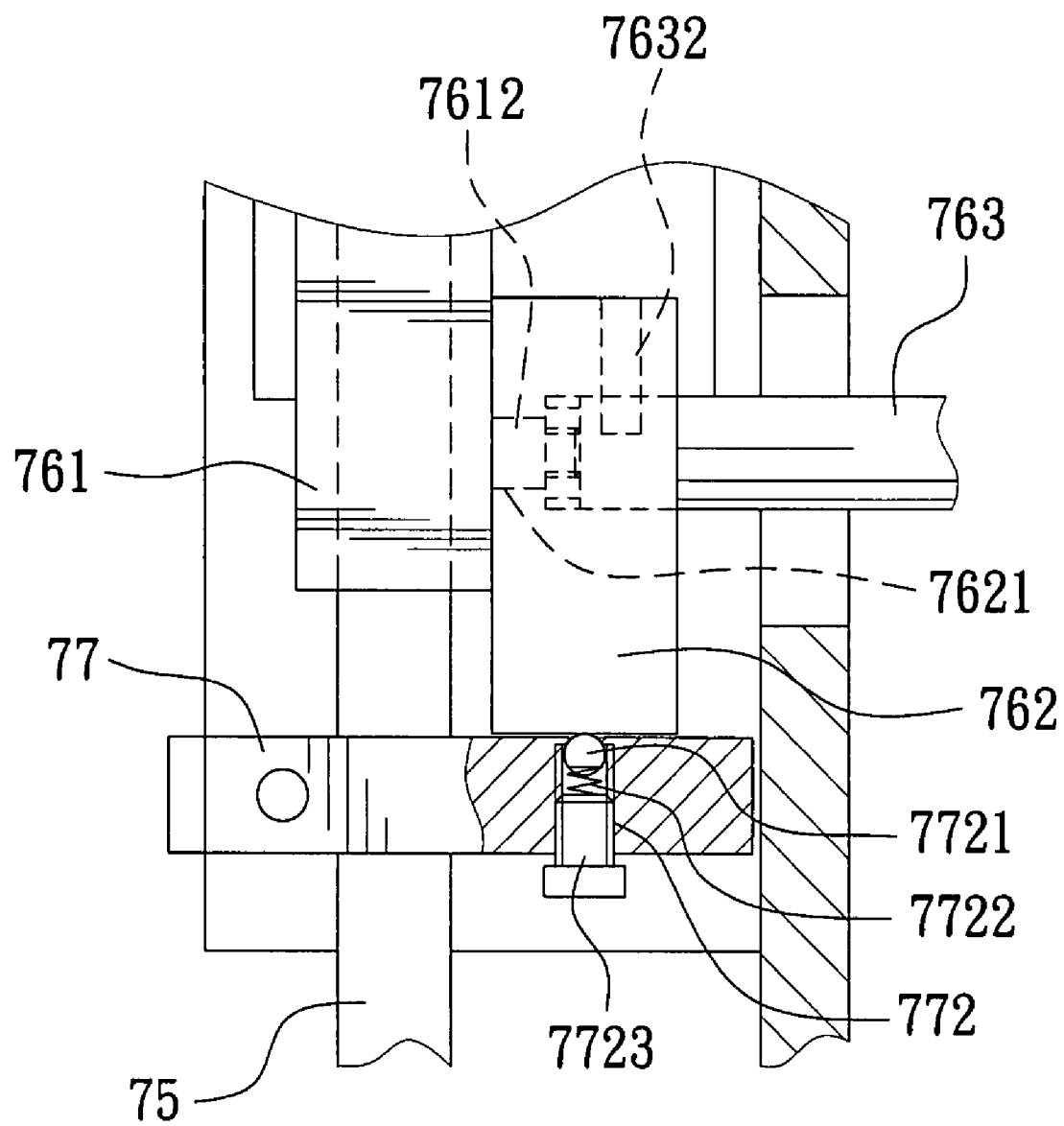

The shifting block 761 is installed under the flange 752 of the micro-adjusting rod 75, having a vertical center hole 7611 for the guide threaded portion 751 to engage with. Referring to FIG. 10, the shifting block 761 has a threaded rod 7612 provided protruding out of the side facing the eccentric block 762, which has an eccentric shaft hole 7621 for pivotally connecting with the threaded rod 7612.

The handling rod 763 is U-shaped, having an upper end formed with a pivotal member 7631 to pass through the eccentric shaft hole 7621 and then fixed in the eccentric block 762 with a fixing pin 7632. The handling rod 763 further has a lower end portion formed with a grip member 7633 for a user to conveniently hold for handling the quick adjusting device 76.

The eccentric block 762 is provided with a highest contact surface 7622 having a farthest distance from the eccentric shaft hole 7621, a medium contact surface 7623 having a medium distance from the eccentric shaft hole 7621, and a lowest contact surface 7624 having a shortest distance from the eccentric shaft hole 7621.

The bottom base 77 is fixed between the lower portion of the two limiting bases 72, having a center through hole 771 to correspond to the center hole 7611 of the shifting block 761 for the guide threaded portion 751 to engage with. Further, the bottom base 77 is provided with a threaded hole 772 facing to the eccentric block 762, and a steel bead 7721, a spring 7722 and a bolt 7723 orderly placed in a lower end of the threaded hole 772 for pushing the eccentric block 762.

Figure 5:
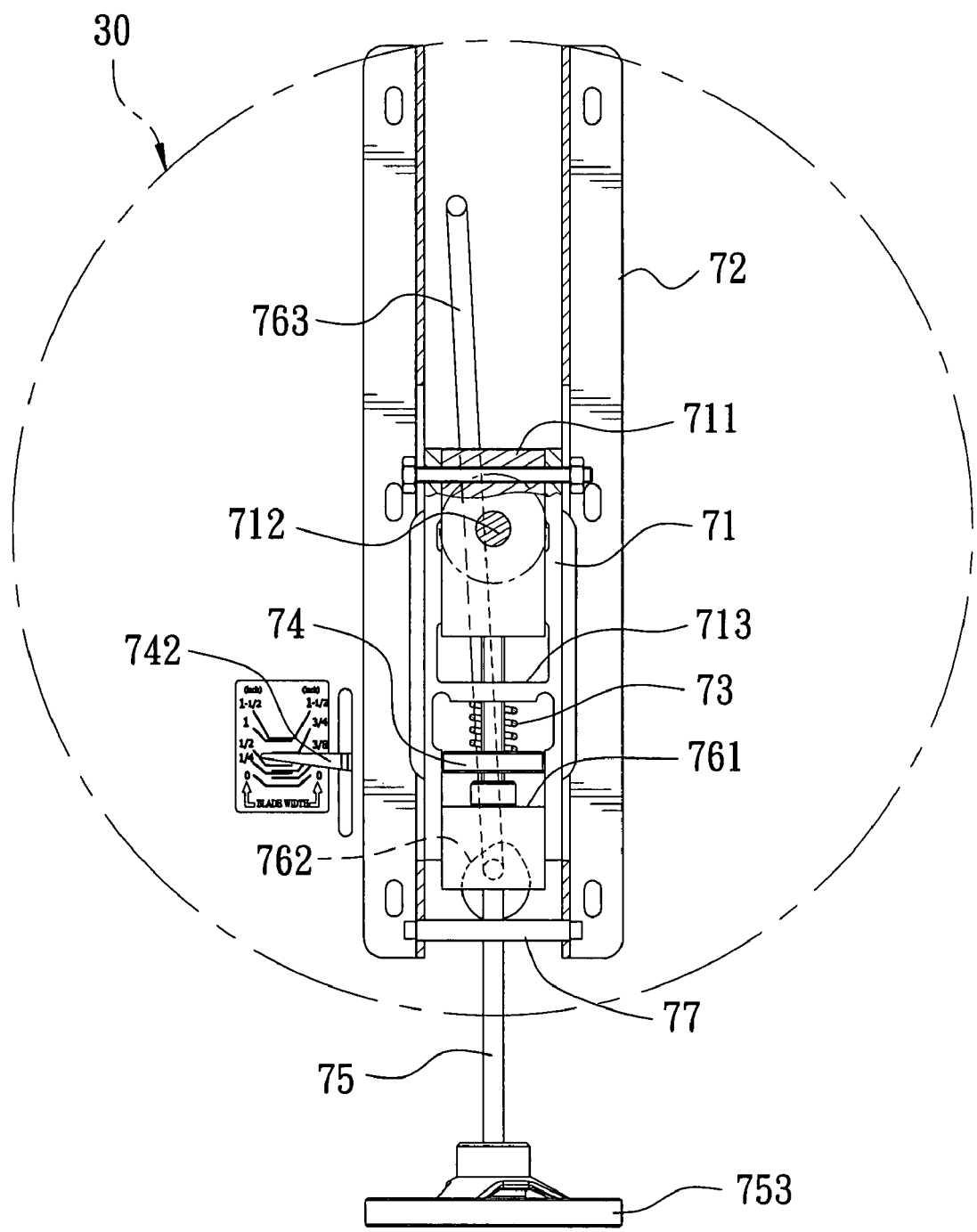
FIG. 5 is a cross-sectional view of the band saw quickly changing device in the present invention.
Figure 7:
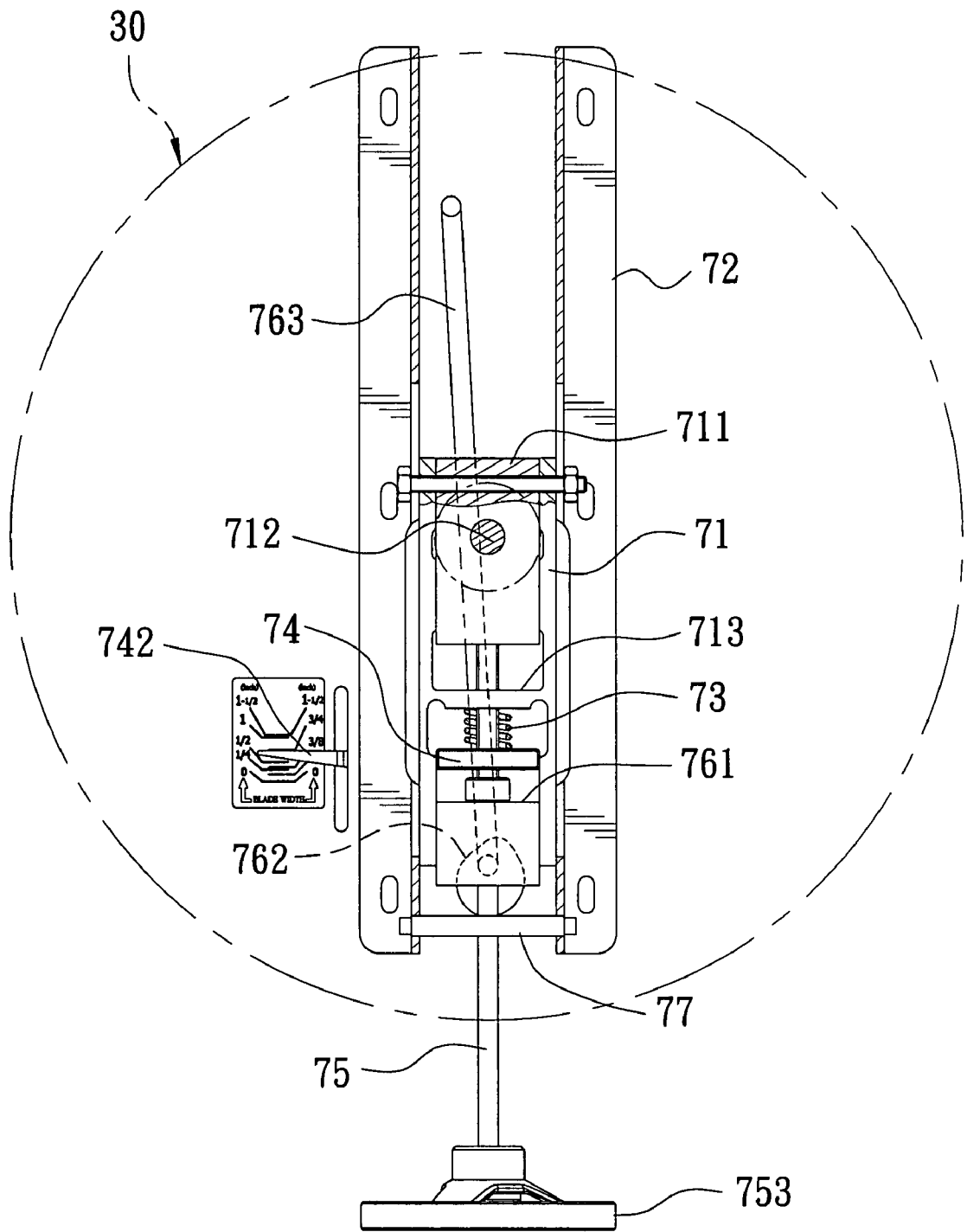
FIG. 7 is a cross-sectional view of the band saw quickly changing device in the present invention, showing it being micro adjusted.

Next, as shown in FIGS. 4, 5 and 7, when the upper turning wheel 30 is to be micro adjusted, a user holds and turns minutely the hand wheel 753 to move the guide threaded portion 751 upward or downward threadably, so the support plate 74 may accordingly be shifted upward or downward. Then the spring 73 located on the support plate 74 is moved up or down by elasticity of the spring 73 between the two limiting bases 72, with a pound needle 742 fixed with the support plate 74 pointing the pound value.

Figure 6:
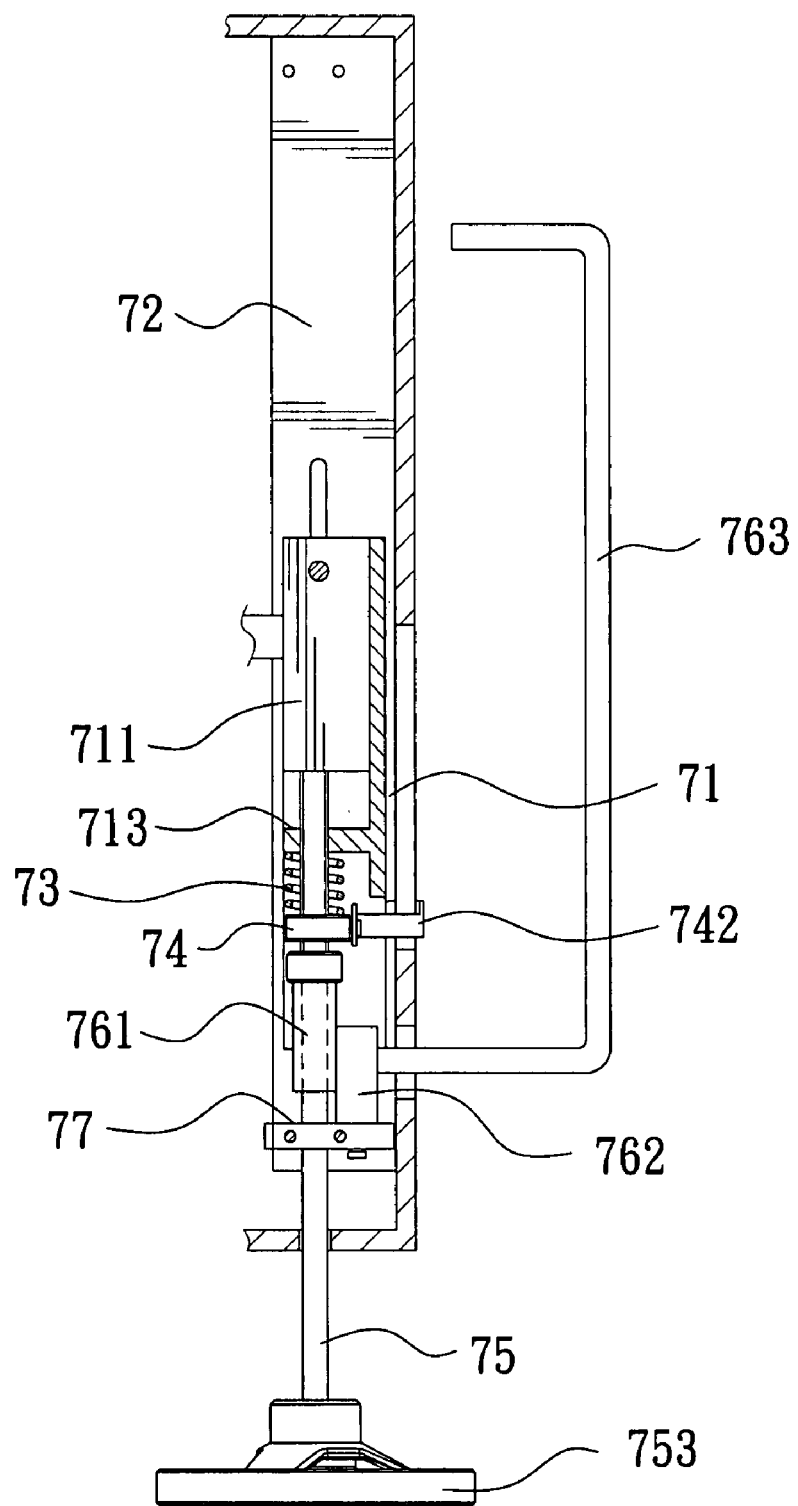
FIG. 6 is another cross-sectional view of the band saw quickly changing device in the present invention.
Figure 8:
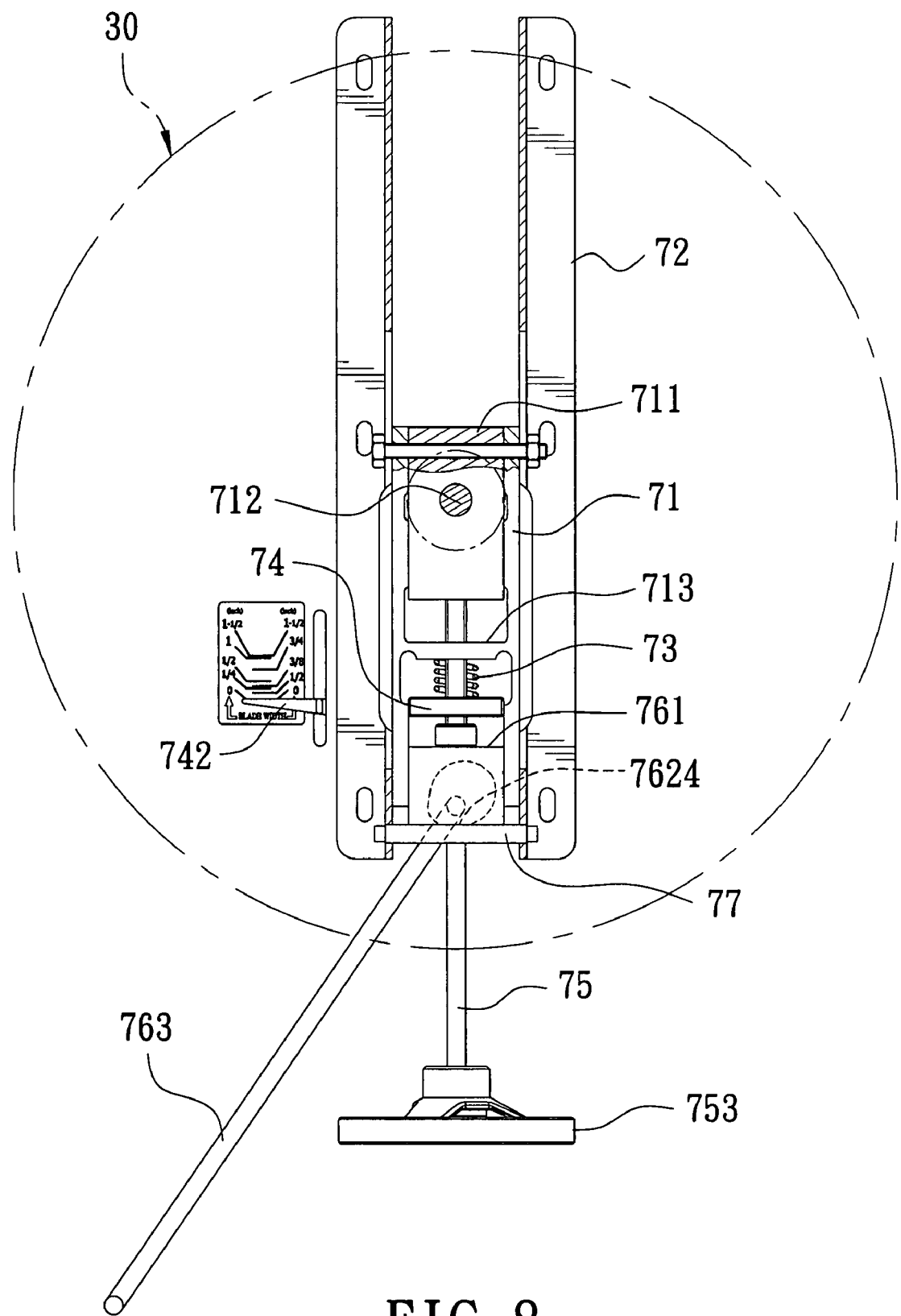
FIG. 8 is a cross-sectional view of the band saw quickly changing device in the present invention, showing it being quickly adjusted in one way.

After finishing the micro adjustment, quickly adjusting operation may be begun. As shown in FIGS. 4, 6 and 8, a user holds the grip member 7633 of the handling rod 763 and then swings it backward, forcing the pivotal portion 7631 rotate the eccentric block 762 downward with the eccentric shaft hole 7621 as a shaft so that the eccentric block 762 so far contacted with the bottom base 77 with the highest contact surface 7622 may rotate to contact with the bottom base 77 with the lowest contact surface 7624. Therefore, the shifting block 761 is forced to shift down and the eccentric block 762 has its eccentric shaft hole 7621 lowered down so that the guide threaded portion 751, the support plate 74 and the spring 73 are moved down, and the sliding base 71 receives the elasticity of the spring 73 to slide quickly down between the two limiting bases 72. Accordingly the distance between the upper turning wheel 30 and the lower turning wheel 40 shortens, so the band saw 60 extending around the two turning wheels 30 and 40 loosens to be easily taken off the two turning wheels 30 and 40 for a new band saw able to be placed thereon. Then the new band saw can be tightened by repeating reversely the operation of the changing processes described above. That is, to swing the handle rod 763 up, forcing the sliding base 71 to slide quickly up between the two limiting bases 72, with the upper turning wheel 30 accordingly moved up to lengthen the distance between the two turning wheels 30 and 40 for tightening the new band saw 60 for use.

Figure 9:
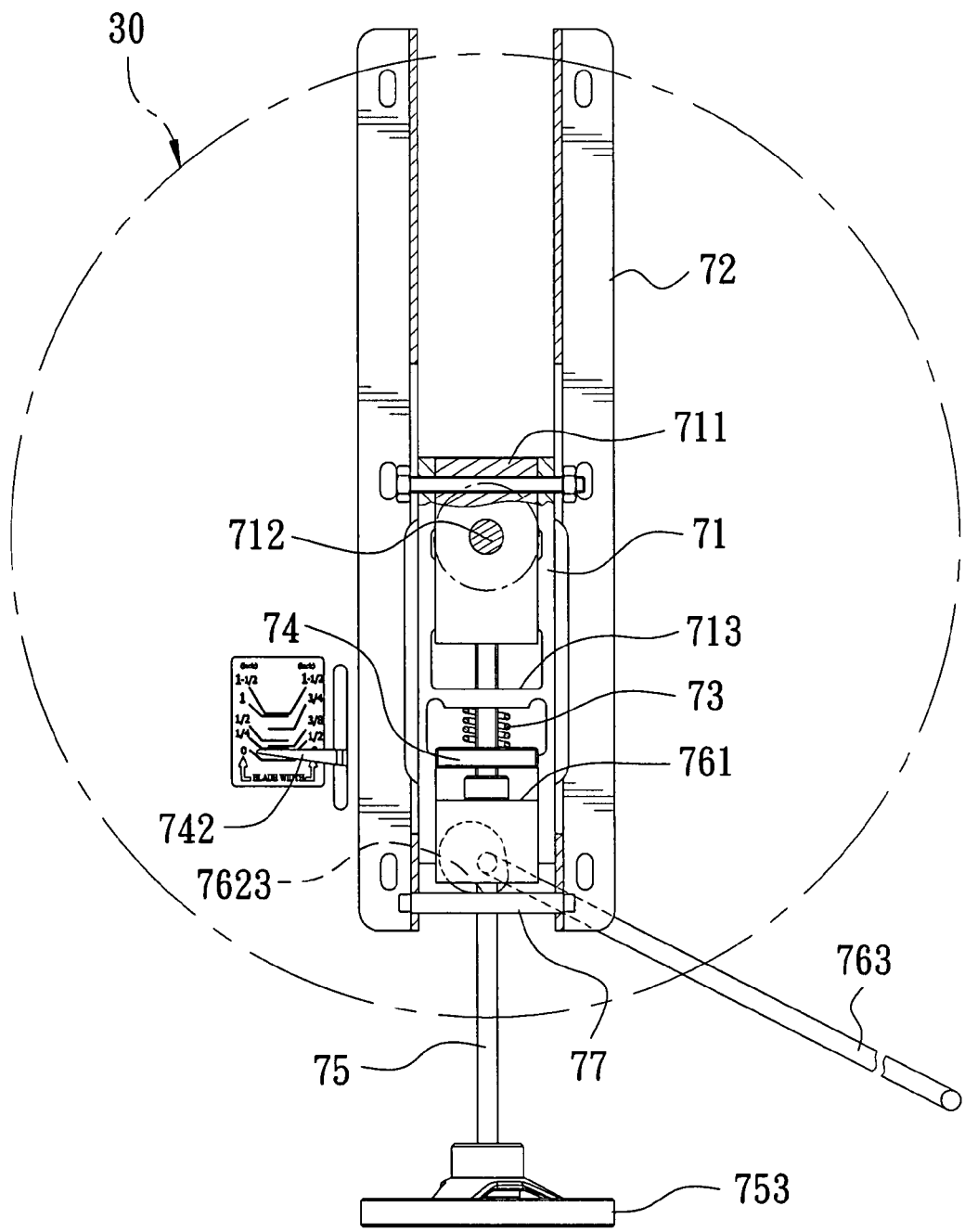
FIG. 9 is a cross-sectional of the band saw quickly changing device in the present invention, showing it being adjusted in another way; and, FIG. 10 is a cross-sectional view of the relative location of a bottom base and an eccentric wheel of the band saw changing device in the present invention.

Next, as shown in FIG. 9, the eccentric block 762 is provided with three contact surfaces, the highest contact surface 7622, the medium contact surface 7623 and the lowest contact surface 7624, so the quickly adjusting device 76 has three stages of quick adjustment. When the handling rod 763 is swung backward, the distance between the two turning wheels 30 and 40 is shortened to loosen the band saw 60, and when the handling rod 763 is swung upward, the distance between the two turning wheels 30 and 40 is lengthened to tighten a new band saw for use. In addition, when the handling rod is swung to the front side, the distance between the two turning wheels 30 and 40 is shortened minutely, so the band saw made of hard metal may be loosened only a little, not liable to get metal fatigue owning to the machine being under resting condition.

Moreover, as shown in FIG. 10, when the eccentric block 762 is connected with the threaded rod 7612 of the shifting block 761, the eccentric block 762 is not apt to slide off its position and kept stable by means of the steel bead 7721, the spring 7722 and the bolt 7723.

In the end, it is worth to mention that the band saw quickly changing device in the invention can quickly achieve the purpose at first by micro adjusting the sliding base 71, and then steering the handling rod 763 of the quickly adjusting device to shorten the distance between the two turning wheels 30 and 40 to loosen the band saw 60 to enable a user to change the old band saw to a new one, enhancing the effectiveness and the quality of a band saw machine. In addition, the band saw 60 can be loosened only a little for rest during the machine not used, reducing its metal fatigue.

While the preferred embodiment of the invention has been described above, it will be recognized that various modifications may be made therein and the appended claims are intended to cover all such modifications that may fall within the spirit and scope of the invention.

What is claimed is:

1. A band saw quickly changing device for a band saw machine, said band saw machine having a machine body, an upper turning wheel and a lower turning wheel arranged on said machine body, a band saw extending around said upper and said lower turning wheel, a motor driving said lower turning wheel that moves the band saw, said band saw quickly changing device combined with said upper turning wheel, said band saw quickly changing device comprising a sliding base, two limiting bases, a spring, a support plate, a micro-adjusting rod and a bottom base, said siding base installed and sliding vertically between said two limiting bases, said spring, said support plate and the bottom base orderly deposited under a limiting member of said sliding base;

characterized by a quickly adjusting device composed of a shifting block, an eccentric block and a handling rod; said shifting block positioned under a flange of said micro-adjusting rod, said shifting block having a center through hole for said micro-adjusting rod to pass through vertically and a threaded rod facing said eccentric block, said eccentric block having an eccentric shaft hole for said threaded rod to engage with, said handling rod having a grip member formed in a lower end; and, said eccentric block rotating with said eccentric shaft hole and said threaded rod as a shaft when said handling rod is swung backward, said micro-adjusting rod, said support plate and said spring moved downward by said eccentric block so that said sliding base may be moved down, shortening the distance between said two turning wheels and loosening said band saw extending around said two turning wheels so as to change said band saw with a new one.

2. The band saw quickly changing device for a band saw machine as claimed in claim 1, wherein said eccentric block is provided with a highest contact surface having a longest distance from said eccentric shaft hole, a lowest contact surface having a shortest distance from said eccentric shaft hole, so said quickly adjusting device has two stages of quick adjustment by swinging backward and forward.

3. The band saw quickly changing device for a band saw machine as claimed in claim 1, wherein said eccentric block is provided with a highest contact surface having a longest distance from said eccentric shaft hole, a medium contact surface having a medium distance from said eccentric shaft hole, and a lowest contact surface having a shortest distance from said eccentric shaft hole, so said quickly adjusting device has three stages of quick adjustment by swinging backward, in an intermediate direction and forward.

4. The band saw quickly changing device for a band saw machine as claimed in claim 1, wherein said handling rod is shaped as U.

\* \* \* \* \*